VIEW A-A

INVENTOR.
JOHN T. POTTER
BY Alfred W. Barber
ATTORNEY

Dec. 2, 1958 J. T. POTTER 2,862,389

ACCESS MECHANISM

Filed Nov. 24, 1951 5 Sheets-Sheet 2

SECTION B-B

*INVENTOR.*
JOHN T. POTTER
*BY* Alfred W. Barber
*ATTORNEY*

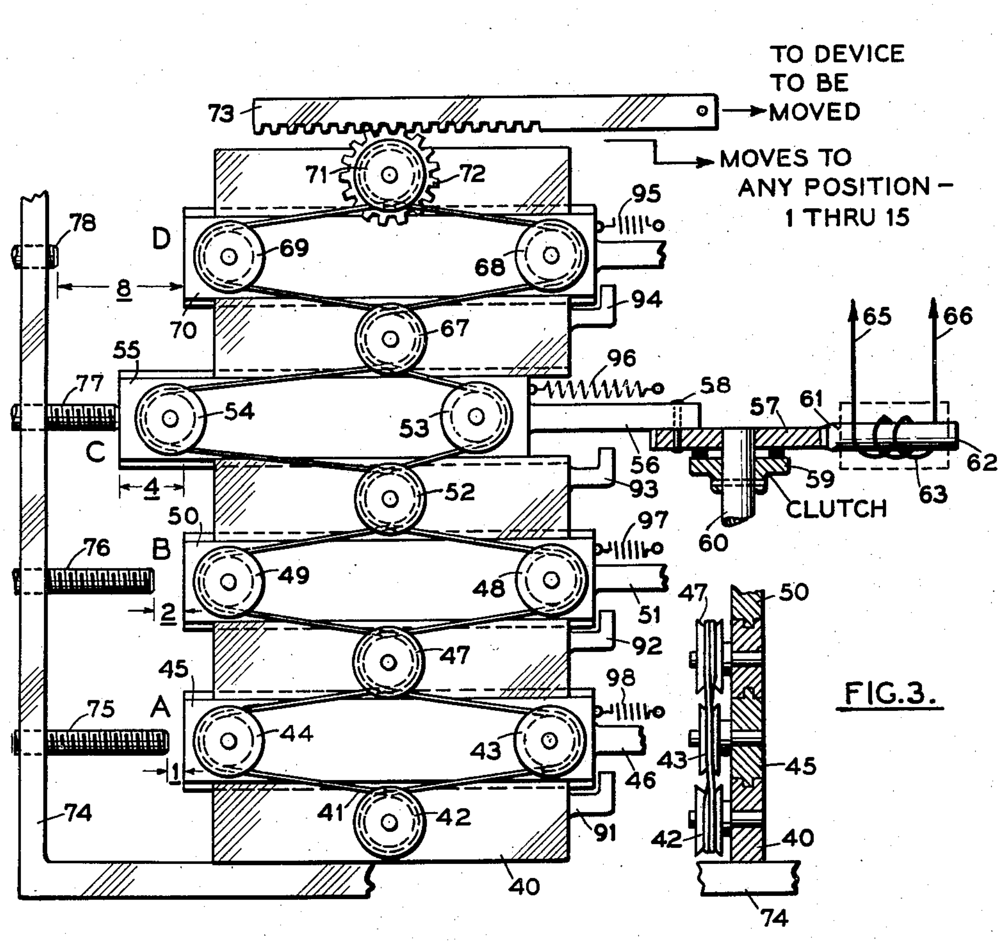
FIG. 3.
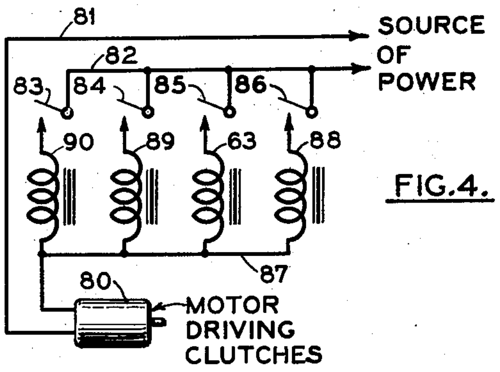
FIG. 4.
| MOTION IN DISTANCE UNITS | BELT CARRIERS TO BE MOVED |
|---|---|
| 1 | A |
| 2 | B |
| 3 | B & A |
| 4 | C |
| 5 | A & C |
| 6 | B & C |
| 7 | A, B & C |
| 8 | D |
| 9 | A & D |
| 10 | B & D |
FIG. 5.
INVENTOR.
JOHN T. POTTER
BY Alfred W. Barber
ATTORNEY INVENTOR.
JOHN T. POTTER
BY
Alfred W. Barber
ATTORNEY Dec. 2, 1958 J. T. POTTER 2,862,389

ACCESS MECHANISM

Filed Nov. 24, 1951 5 Sheets-Sheet 5

INVENTOR.
JOHN T. POTTER
BY Alfred W. Barber
ATTORNEY 2,862,389
Patented Dec. 2, 1958

2,862,389

ACCESS MECHANISM

John T. Potter, Sands Point, N. Y.

Application November 24, 1951, Serial No. 258,080

1 Claim. (Cl. 74—1)

The present invention concerns mechanical movements and, in particular, devices for moving predetermined distances. One typical application for such devices is in access mechanisms in information storage systems.

An information storage system within the meaning of the term as used in the present application is a system in which a great plurality of bits of information are stored in recorded form. With the information recorded and stored, one major problem in such systems is a device for selecting a carrier upon which predetermined bits of information are recorded. The present invention concerns access mechanisms for such systems. The access mechanism or device for selecting a carrier is a device which may be directed to any one of a great plurality of predetermined points or positions and which will quickly and accurately travel to such a point or position. As an example, one such typical access mechanism will move a magnetic reproducing head to any one of 128 equally spaced positions in a fraction of a second. The devices of the present invention carry out the required motions quickly and accurately.

One method for accomplishing the motion according to the present invention is based on binary addition of a suitable number of properly ratioed increments. For example, incremental motions in the ratios 1, 2, 4, 8, 16, 32 and 64 are made available and are combined to provide the desired motion. The increment 1 represents the distance between any two adjacent desired positions. Hence, any position from 1 to 128 may be attained by adding the proper increments which in no case will exceed seven. Thus, position 1 is attained by utilizing increment 1 alone, position 2 by utilizing increment 2 alone, position 3 by adding increments 1 and 2, position 97 by adding increments 1, 32 and 64 and so on. Since the motion increments are added simultaneously the movement to any point from 1 to 128 is accomplished in essentially the same period of time. It may be pointed out that a decimal system would require nine units increments and nine tens increments to provide 99 possible positions, that is, it would require eighteen rather than seven increments and would provide 25% fewer selectable positions.

According to the present invention, the basic increments of 1, 2, 4, etc. units to be added may be obtained either by setting up these predetermined increments in the proper ratios or by setting up a basic increment equal to 1 and multiplying this increment by 2 as many times as is necessary to provide each of the other increments 4, 8, etc. Thus, the device of the present invention consists in means for providing increments 1, 2, 4, 8, etc. and means for adding the increments provided in any predetermined combination. Some of the variations, particularly those which multiply to provide the increments have the additional advantage that the output motion may readily be made to assume any predetermined form such as simple harmonic motion.

One object of the present invention is to provide a method of and means for providing a mechanical movement to any one of a great plurality of predetermined positions.

Another object is to provide mechanical movement to any one of a great plurality of predetermined positions by means of binary addition of a relatively small number of predetermined movements.

Still another object is to provide a mechanical displacement system in which the time of movement from an initial position to a final position is constant regardless of the distance moved.

A further object is to provide a mechanical displacement system in which back-lash is a function of the smallest increment of movement regardless of the total displacement.

A still further object is to provide a mechanical displacement system in which movement may be made sinusoidal or of almost any law of motion.

These and other objects of the present invention will be apparent from the detailed description of the invention given in connection with the various figures of the drawing.

In the drawing:

Fig. 3 shows a modified form of the present invention.

Fig. 4 shows a typical control circuit for the form of the invention shown in Fig. 3.

Fig. 5 shows a table useful in explaining the operation of the invention as shown in Fig. 3.

Figure 1:
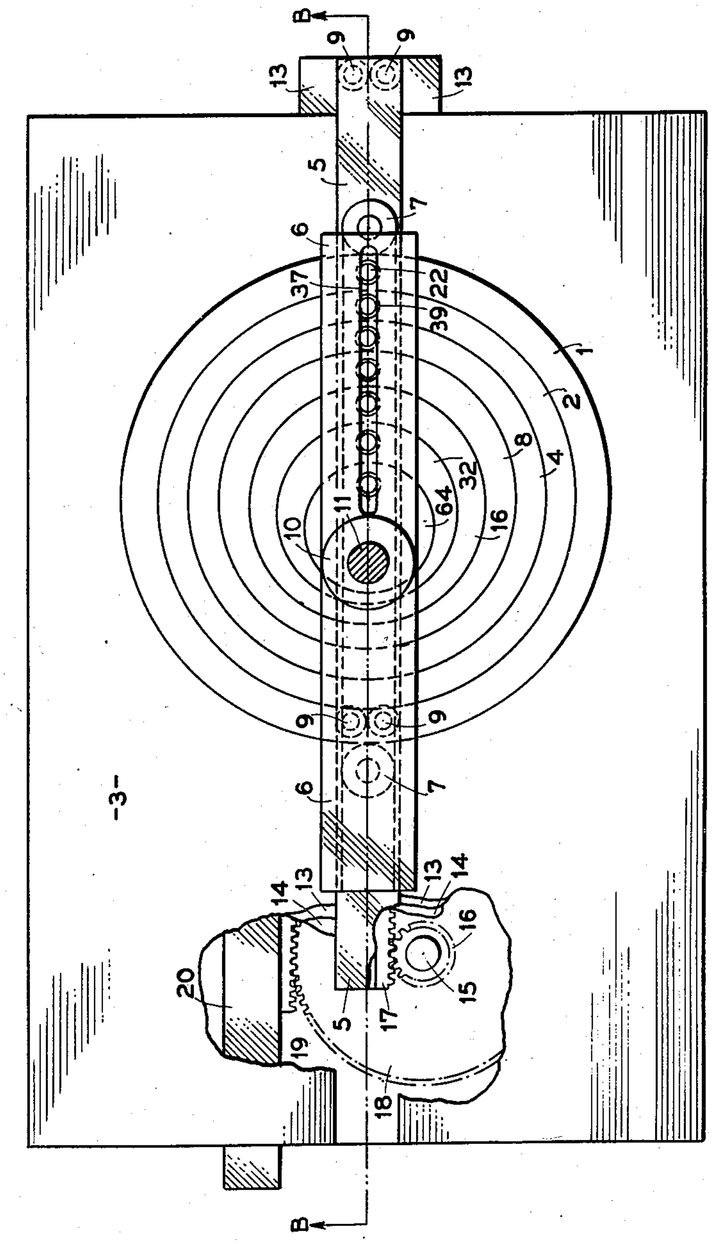
Fig. 1 shows a plan view of one form of the present invention.
Figure 2:
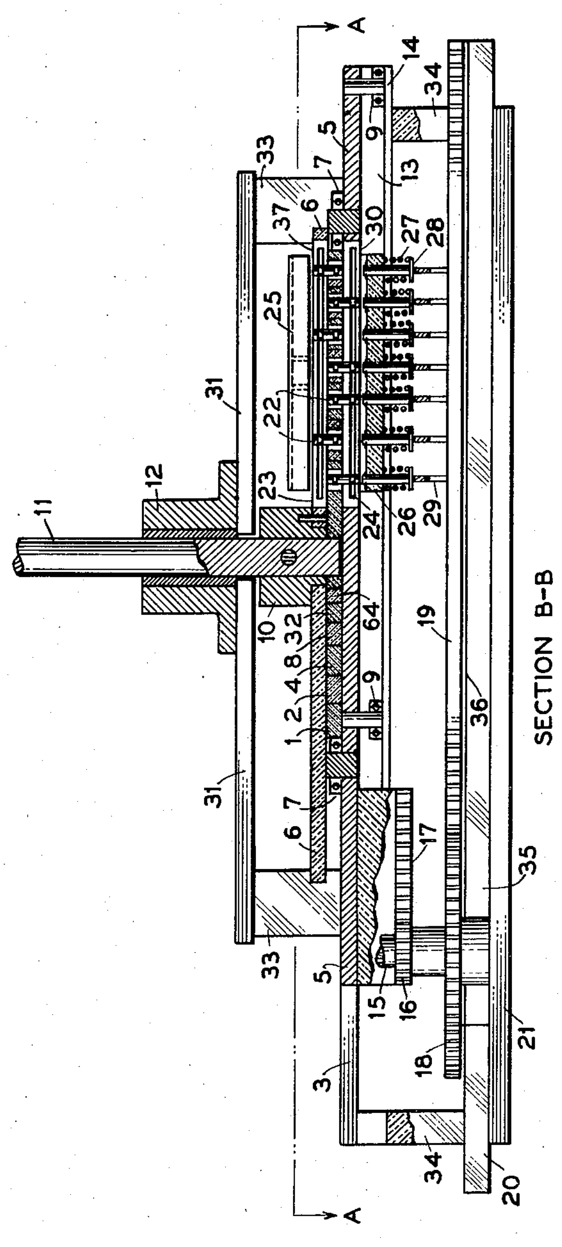
Fig. 2 shows a side view partly in section, of the form of the invention shown in Fig. 1.

Figs. 1 and 2 show a plan and side view partly in section respectively of one form of the present invention. As shown this is a device for providing motion increments related in binary fashion, i. e. motion increments of 1, 2, 4, 8, 16, 32 and 64 units. The four annular elements 1, 2, 4, 8, 16, 32 and 64 are nested together so that starting with 1 as the outside element 2, 4 etc. fit accurately and snugly progressively one inside the other. These annular elements or rings are free to turn but fit without lost motion. Each ring is eccentric in proportion to its number. Thus, ring 1 has one unit of eccentricity so that, if it is rotated once around ring 2, an indicator as roller 7 bearing on its periphery will be moved one unit and back to its original position. In the same way if ring 2 only is rotated, roller 7 will be moved two units and so on to ring 64 which will move roller 7 by sixty four units. The motion due to the rotation of the eccentric rings is transmitted by rollers 7 to rack bar 5 and rack 17 attached thereto. It will be evident that the motion produced may be utilized in many ways and that the rank and pinion system shown is merely an illustration of one possible manner of transmitting the motion to other instrumentalities.

In order to rotate the rings arm 6 rotated by shaft 11 turning in bearing 12 is provided. Pins 22 serve to couple rings to arm 6. Tappets 27—28—29 actuate the pins. These tappets may be actuated by suitable means, not shown. When a pin 22 is moved to its upper position, it couples a ring to arm 6 so that when shaft 11 is rotated, arm 6 rotates the ring and an eccentric component of motion is imparted to rack bar 5, etc. If more than one ring is rotated simultaneously, the motion provided is the sum of the eccentric components of these rings. Thus, if rings 1, 4 and 16 are rotated, a motion of 21 units is provided. Also, with the seven rings related in binary fashion any motion from 1 to 127 units of motion in unit steps may be provided. Rings which are not to impart motion are locked stationary by pins 22 in their down position engaging stationary bar 24—30.

To complete the assembly a main plate 3 is provided together with shaft bearing support plate 31 mounted on plate 3 by means of supports 33. Rack 17 actuates pinion 16 on shaft 15 which in turn rotates gear 18 engaging second rack 19 and rack bar 20. A lower support plate 21 mounted to main plate 3 by means of supports 34.

Thus, the mechanism shown in Figs. 1 and 2 is suitable for providing increments of linear or angular motion having any integral value from 1 to 127 where 1 represents the basic increment of motion. It will be evident that the unit of motion may be chosen to have any suitable value so that the motion range covers any desired range.

The device shown in Fig. 3 is a modified form of the present invention in which an endless belt 41 passes around pulleys 42, 43, 44, 47, 48, 49, 52, 53, 54, 67, 68, 69 and 71. Frame 74 supports stops 75, 76, 77 and 78 as well as pulley slides 40 and stops 91, 92, 93 and 94. Pulleys 42, 47, 52, 67 and 72 are held stationary while pulleys 43—44, 48—49, 53—54 and 68—69 are mounted in pairs on slides 45, 50, 55 and 70. Endless belt 41 is secured to pulley 71 so that as the belt is moved, pulley 71 and attached pinion gear 72 are rotated and motion is supplied to rack 73. Return springs 95, 96, 97 and 98 are supplied to keep the slides all normally pulled against stops 94, 93, 92 and 91 respectively. The slides may be pushed by means of actuator handles 46, 51, 56, etc. some details of handle 56 and the actuating mechanism being shown. While any suitable pushing mechanism may be utilized a rotating shaft 60, clutch 59, clutch plate 57, clutch release 61, release solenoid 62, and solenoid coil 63 receiving power over leads 65 and 66 is shown by way of illustration. When power is supplied over leads 65—66, the clutch is released and power from rotating shaft 60 through the clutch pushes slide 55 against stop 77. With slide 55 pushed against stop 77 the portion of the belt around pulley 54 is lengthened while the portion around pulley 53 is shortened by the same amount. This motion of the belt 41 will be seen to force pulley 71 to rotate clockwise by an amount proportional to the motion of slide 55 and hence to transmit a corresponding output motion to rack 73. It will also be seen that the motion of one or more of the remaining slides will add linearly to this original motion. In other words the output motion of rack 73 is proportional to the sum of motions of the slides. The stops 75, 76, 77 and 78 are adjusted to allow motion increments of 1, 2, 4 and 8 units respectively. By adding combinations any motion in integral steps from 1 to 15 may be obtained and it will be apparent that any desired total range of motion may be obtained by using additional slides having binary related motion increments.

Fig. 4 shows a circuit diagram of a suitable clutch driving motor 80 (for driving shaft 60 of Fig. 3) receiving power over lead 81 and over lead 82 through one of solenoid switches 83, 84, 85 or 86 and corresponding solenoid 90, 89, 63 and 88 and common lead 87. In operation, a switch or switches are closed energizing the corresponding solenoid or solenoids and energizing the clutch driving motor. The solenoids release the desired slides and the motor drives them against their stop to provide the predetermined output motion.

The pulley slides 45, 50, 55 and 70 are also designated A, B, C and D. The table of Fig. 5 shows some examples of combinations of belt carriers (pulley slides) moved and the resulting relative distance moved. For example, moving slides A, B and C all at the same time produces 7 units of motion while moving slide D alone produces 8 units.

Figures 6, 7:
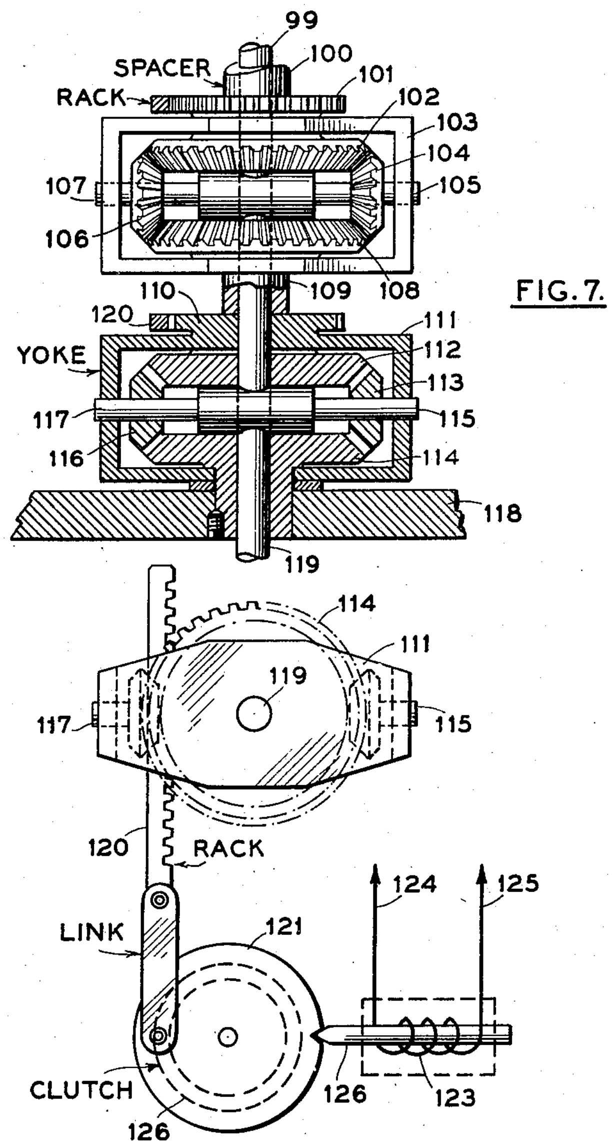
Figs. 6 and 7 show two views of a third form of the present invention.

Figs. 6 and 7 show a mechanical motion adding device. While only two stages are shown for simplicity, any required number of stages may be utilized. The first stage includes axial shaft 99—119, yoke 103, the two bevel gears 104 and 106 freely turning on axial shaft 105—107 mounted in yoke 103, input bevel gear 102 and output bevel gear 108. Housing 103 may be rotated by a rack moving across pinion gear 101. The function of a given stage in this system is to pass along from its input gear to its output gear any motion originating in a lower stage and imparted to the input gear and to add to this motion any motion imparted to the yoke through the rack and pinion.

The second stage includes pinion gear 110, yoke 111, bevel gears 112 and 114 mounted on shaft 119 and bevel gears 113 and 116 on shafts 115 and 117. Frame 118 supports the assembly.

Fig. 6 shows one manner in which motion may be imparted to the housing from rack 120. A wheel 121 is driven from a suitable friction clutch in any convenient manner, not shown. If wheel 121 is linked to rack 120, its rotation will move the rack by an amount depending on the radius of the point at which the link is attached to the wheel. Wheel 121 is allowed to rotate by withdrawing solenoid pin 126 from the detent notch in wheel 121 by passing current through coil 123 over leads 124 and 125 from a suitable control source, not shown. By attaching the links at different points in the wheels, any desired resulting motion may be imparted to the corresponding rack. It will be seen, also that the resulting motion will have a sinusoidal form with no sudden changes in velocity.

By imparting motions related in binary fashion to a series of racks and hence input gears of the system, a binary, related system is provided. With binary related motions and the adding function combined, a system capable of providing motion increments related according to the binary system results.

Figures 8, 9, 10:
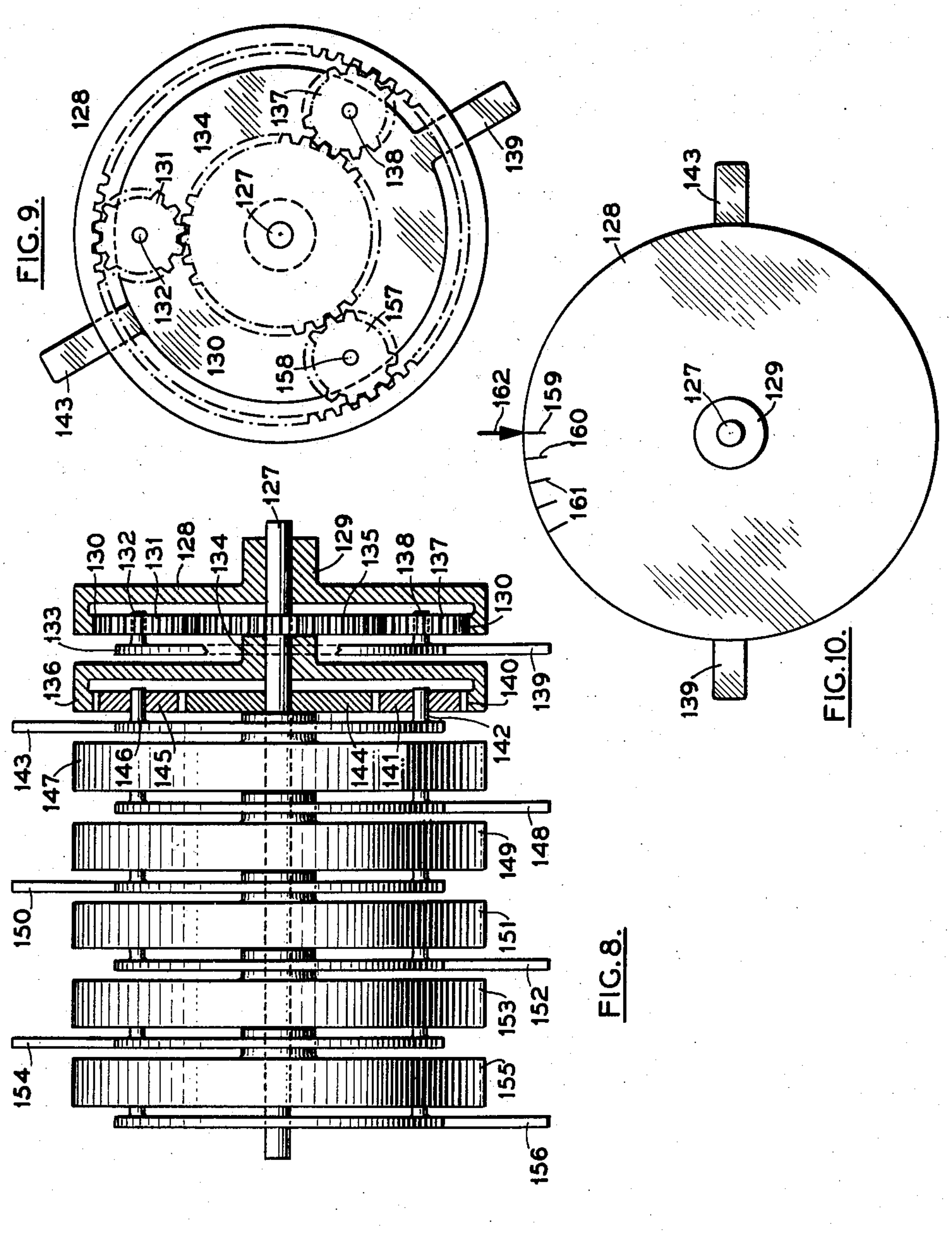
Figs. 8, 9 and 10 show views of a fourth form of the present invention.

Figs. 8, 9 and 10 show a preferred form of the present invention. While any number of stages may be used the drawing shows a seven stage unit. With this seven stage unit the number of binary units of motion possible is 1 plus 2 plus 4 plus 8 plus 16 plus 32 plus 64 or 127. In other words any increment of motion may be provided which is represented by any whole number from 1 to 127 inclusive. Two important features of this form of the invention are that no matter how many stages are provided the inaccuracy of the output motion will always be less than twice the back-lash of the unit providing the largest motion increment and the force required to actuate any unit is always less than the force required to actuate this same largest increment unit.

Fig. 9 shows an end view of one increment producing unit. It includes an internal ring gear housing 128 carrying internal ring gear 130, hub mounting plate 134 with actuating handle 139 and mounting hubs 132, 138 and 158 for planetary gears 131, 137 and 157 respectively, and main shaft 127 carrying inner planetary gear 135. Let the number of teeth on gears 131, 137 and 157 be A, on gear 135 be B and on gear 130 be C. Then if actuating handle 139 is moved, the motion imparted to housing 128 will be equal to the motion of handle plus a motion equal to this motion multiplied by the ratio of A to B. In order to illustrate let A be 48, B be 96 and C be 192. Then the motion of housing 128 will be 1½ times the motion of actuating handle 139. If housing 128 is the end unit as shown, it is pinned to shaft 127 so that the rotation of housing 128 imparts an output rotary motion to shaft 127. Again if handle 139 is rotated 180 degrees, an output rotation of shaft 127 of 270 degrees will be produced. Now if handle 139 is held stationary, and gear 135 is rotated, ring gear and hence shaft 127 will be rotated by an amount equal to the ratio $B/C$ or in this case ½. Hence, output shaft 127 may be given motion increments equal to 1½ times the angular motion of arm 139 or ½ the angular rotation of the next unit which turns gear 135.

Fig. 8 shows seven units connected in tandem. These units include housings 128, 136, 147, 149, 151, 153 and 155 with corresponding actuating arms 139, 143, 148, 150, 152, 154 and 156 all concentric with output shaft 127. Since all of these units comprise the same mechanical elements, only housing 128 is shown cut-away and 136 in section to disclose planetary gears 141 and 145 on hubs 142 and 146 carried by the body of actuator 143 and engaging central planetary gear 144 and internal ring gear 140. Since the motion is reversed at each unit stage, the actuator handles are shown alternately on opposite sides of shaft 127. From the above description of Fig. 9 it will be seen that if the motion of shaft 127 due to a given motion of arm 139 is considered as a basis, that an equal motion, in the opposite direction, of arm 143 will provide ½ that motion of shaft 127, of arm 148 a motion of ¼, of arm 150 a motion of ⅛, of arm 152 a motion of $\frac{1}{16}$, of arm 154 a motion of $\frac{1}{32}$ and of arm 156 a motion of $\frac{1}{64}$ of the basic motion. If, on the other hand, the motion produced in shaft 127 due to a given motion of arm 156 is taken as the basis, similar motions of arms 154, 152, 150, 148, 143 and 139 will supply motions of 2, 4, 8, 16, 32, and 64 times the basic motion. Also if equal motions are applied to more than one arm simultaneously, the motion of shaft 127 will be the sum of the motions which would be generated if each arm were moved independently. Thus the device may be utilized to add, subtract, multiply or divide mechanical movement. While binary operations have been illustrated it will be evident that by changing the gear ratios and/or the arm movements that other numerical systems, such as the decimal system, may be employed at will.

Fig. 10 shows an end view of the system wherein a scale 159, 160, 161 with an indicator 162 is shown which may be utilized as a means for observing the output motion.

While only a few embodiments of the present invention have been shown and described, many modifications will be apparent to those skilled in the art within the spirit and scope of the invention as set forth in the appended claim.

What is claimed is:

In a mechanical displacement system, the combination of, a plurality of linear displacement determining devices for determining displacements related in accordance with a predetermined series at least two steps in said series being related in accordance with the steps of a binary series and the sum of a plurality of said steps being ten, couplings between said devices to add said displacements, actuators for each of said devices and an output coupling for transmitting the sum of said displacements of actuated devices in rectilinear fashion to a utilization means.

References Cited in the file of this patent

UNITED STATES PATENTS

| | | |
|---|---|---|
| 935,034 | Knecht | Sept. 28, 1909 |
| 1,139,972 | Henschel et al. | May 18, 1915 |
| 1,582,879 | Midboe | Apr. 27, 1926 |
| 2,338,221 | Willens | Jan. 4, 1944 |
| 2,402,027 | Crowther | June 11, 1946 |

FOREIGN PATENTS

| | | |
|---|---|---|
| 592,722 | France | Aug. 8, 1925 |